Patented July 14, 1925.

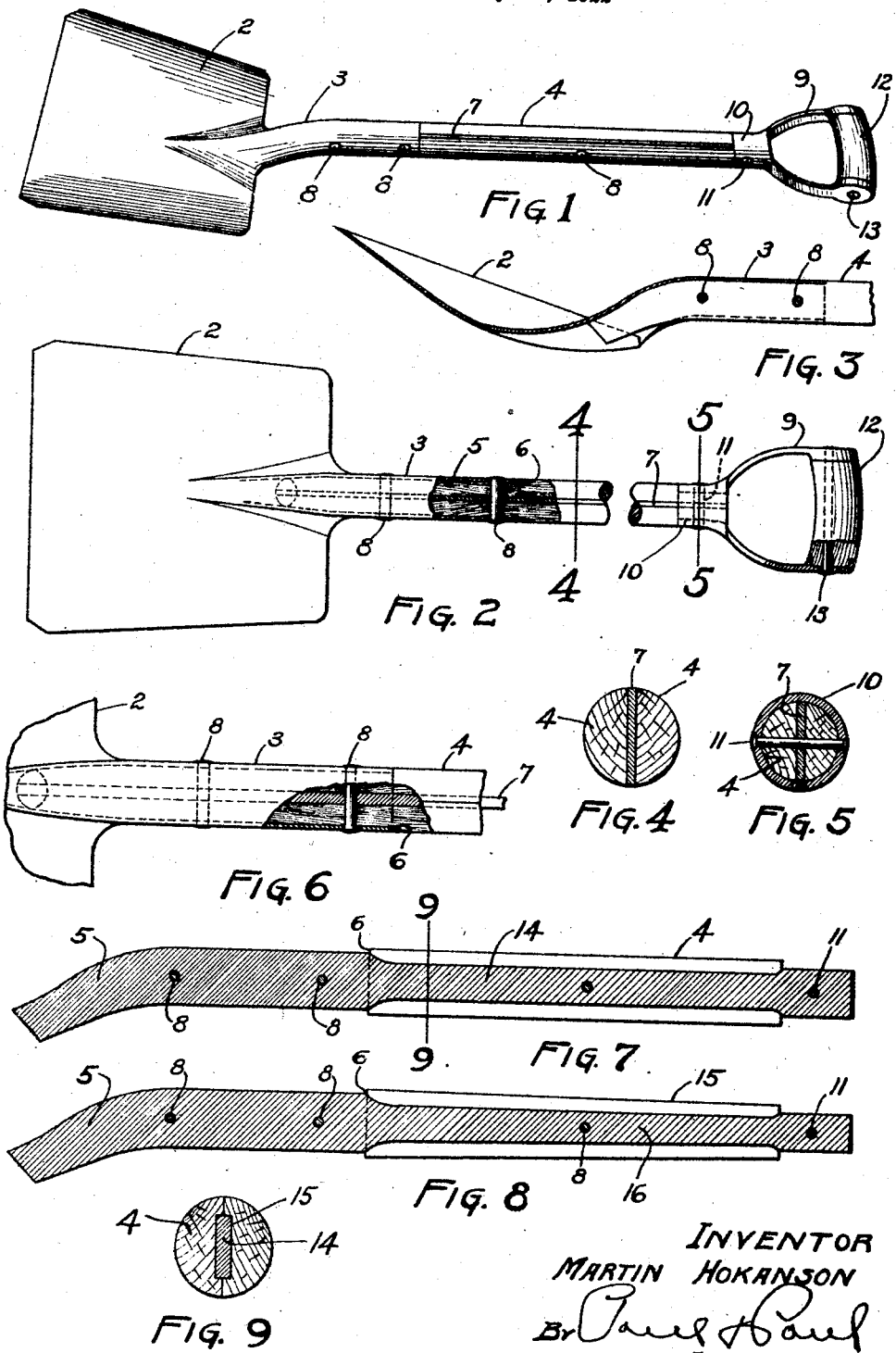

1,545,770

UNITED STATES PATENT OFFICE.

MARTIN HOKANSON, OF DULUTH, MINNESOTA, ASSIGNOR TO MARSHALL-WELLS COMPANY, OF DULUTH, MINNESOTA, A CORPORATION OF NEW JERSEY.

SHOVEL.

Application filed July 10, 1922. Serial No. 573,963.

*To all whom it may concern:*

Be it known that I, MARTIN HOKANSON, a citizen of the United States, resident of Duluth, county of St. Louis, State of Minnesota, have invented certain new and useful Improvements in Shovels, of which the following is a specification.

The object of my invention is to provide a shovel having a smooth surface on which the hand of the user may slide without any enlargements or projections at the point where the wooden handle enters the steel socket. Evidently any sharp edges or corners at this point would injure the hand of the user and be a decided objection to the shovel.

A further object is to provide a shovel handle of such construction that the walls of the steel socket can be set into the wood and made flush therewith without weakening the handle materially at the point where it enters the socket, this being the part of the handle that is usually subjected to the greatest strain.

A further object is to provide a method of strengthening the shovel and shank against a bending strain particularly at the point where the blade and shank are united, as here the shovel in certain kinds of work, such as railroad tie tamping, is subjected to an extreme strain and is frequently broken.

Other objects of the invention will appear from the following detailed description.

The invention consists generally in various constructions and combinations, all as hereinafter described and particularly pointed out in the claims.

In the accompanying drawings forming part of this specification,

Figure 1 is a perspective view of a standard shovel embodying my invention,

Figure 2 is a plan view, partially in section, showing the manner of reinforcing the handle, Figure 3 is a detail sectional view showing the manner of fitting the handle into the socket of the shovel blade, Figure 4 is a sectional view on the line 4—4 of Figure 2, Figure 5 is a sectional view on the line 5—5 of Figure 2, Figure 6 is a detail sectional view showing the manner of securing the handle within the shovel blade socket, Figure 7 illustrates the manner of concealing the reinforcing blade or bar within the shovel handle, Figure 8 is a similar view, showing the reinforcing blade applied to a tapered handle, Figure 9 is a sectional view on the line 9—9 of Figure 7.

In the drawing, 2 represents the shovel blade formed integrally, as usual, with the metal shank 3 which may be a continuous unbroken tube but in the type of shovel known as "hollow backed" is split or open in the rear. 4 represents a wooden handle having an end 5 that is reduced to fit into the socket of the shank 3, the end of the shank fitting against shoulders 6 formed in the handle and the surface of the shank being flush substantially with the surface of the handle so that the joint between them will be smooth and will have no projections or sharp edges to injure the hand of the user.

The shovel blade and the shank having the socket for the handle therein are heat treated to increase the wearing qualities of the blade and at the same time strengthen the blade and the shank, particularly at their point of intersection.

The hollow back type of shovel which I have shown herein and which I prefer to use in place of the strap welded type on account of the difference in expense of manufacture, has the disadvantage of not being as strong and capable of resisting bending strains as the strap weld construction. By heat treating the socket shank as well as the blade, I materially increase or strengthen all these parts and their capability of resistance to a bending strain and thereby prolong the life of the shovel. Evidently a tool of this kind is only as strong as its weakest part and if there is a tendency to break at the point where the blade joins the shank socket or where the handle enters the socket, then there is nothing gained by making the blade or the grip of superior material or of particularly fine workmanship, for when the break occurs, the tool is worthless and can only be thrown away, often though the blade and grip may be in perfect condition and could have a long period of wear. Hence in designing this shovel I have paid particular attention to the points that are subjected to the greatest strain and where breakages usually occur, and by using my method of construction I have been able to practically eliminate such breakages, making each part as strong as all the rest, and thereby prolong the life of the shovel without, however, adding materially to the expense of construction. The blade and socket shank may be varied in shape and general design but for the particular type of shovel such as used in railway tie tamping I prefer to employ the square pointed blade design herein shown.

A reinforcing strip 7, preferably of steel, is inserted into the handle, which is divided longitudinally into two sections, as indicated in Figure 4, to allow for the insertion of the reinforcing plate or strip between them, the edges of the strip being rounded and smoothed so that they will merge perfectly with the surface of the handle and there will be no danger of injuring the hand as it is moved back and forth in the use of the shovel. This reinforcing strip is arranged edgewise to the line of strain on the shovel and resists any tendency of the handle to buckle or bend, particularly at the weakest point where it enters the socket. Suitable means, such as rivets 8, are provided, passing through the walls of the socket and through the sections of the handle and the reinforcing strip and having their ends headed or upset and flush with and conforming to the smooth surface of the handle. The reinforcement preferably extends throughout the length of the handle in a vertical plane and while any suitable material may be used, I preferably cut it out of sheet steel.

It will be noted that the reinforcing strip extends for a considerable distance into the shank socket, in fact, to the end of the wooden handle, the rivets passing through this strip and clamping it firmly to the sections of the handle and the walls of the socket, any downward or upward strain being resisted and taken up by edgewise position of the strip in the handle, the reinforcement compensating for the reduced diameter of the handle at the point where it enters the socket and providing sufficient strength at this point to resist the pressure of the user on the handle. I prefer to heat treat this reinforcing strip, for I have found that by so doing I can make the steel approximately one-half the weight and thickness that would otherwise be required.

The hand grip 9 has a socket 10 to receive the end of the handle and a rivet 11 passes through the socket 10 and through the handle and reinforcing strip and secures them rigidly together. A slightly curved wooden grip 12 is provided through which passes a long rivet 13, binding it firmly between the arms of the handle grip.

The hand grip portion o the handle may be made of malleable or pressed metal and the shank 10 formed integrally therewith for enclosing the outer end of the wooden handle.

In Figure 7 I have shown a modified construction which consists in providing a reinforcing strip 14 that is of less width than the diameter of the handle, the sections of the hande being gouged out or grooved as at 15 to allow the insertion of the reinforcement, the edges of the handle sections meeting and fitting snugly together and completely concealing the reinforcement. The handle is reduced at both ends enter the socket of the shovel blade and the shank of the grip portion and rivets corresponding to those described pass through the handle sections and the reinforcement and bind them all firmly together.

As shown in the figure, the steel reinforcement is wider at the ends than in the middle, so that it will just fit into the socket shovel and the grip shank. The wood part of the handle will be somewhat greater in diameter than the middle portion of the reinforcing strip so that there will be suitable thickness on either side of the strip to provide a suitable joint between the two sections of the handle when they are put together. The steel in the shovel socket is approximately one thirty-second of an inch in thickness and this will enable me to bevel off the shovel handle where it enters the socket and make a perfect fit. I may find it necessary to extend the reinforcing strip to the end of the socket, shaping it, as indicated in Figure 7, to conform to the curvature of the socket.

In Figure 8 I have shown a tapered handle 15 with a tapered concealed reinforcement 16 fitting therein and secured in substantially the same manner as described with reference to Figure 7. Where this tapered reinforcement is used, it would be necessary to provide a tapered gauge in the opposing walls of the handle sections or to avoid this expense, the reinforcement may be extended to the surface of the handle, as shown in Figure 1, and secured therein in substantially the same way.

In Figure 8 I have indicated the reinforcing strip made wider at each end and conforming to the socket of the shovel blade and the grip shank.

The object of having the reinforcing plate wider at each end is to bring it into contact with the wall of the shovel blade socket and the grip socket and thereby transmit strain properly from one part of the shovel to the other and provide the desired degree of resistance at the point where breakages usually occur.

I claim as my invention:

1. A shovel, scoop or spade comprising a blade having a hollow shank thereon at one end forming a socket, a handle composed of longitudinally divided sections having one end fitting said socket, a reinforcing blade interposed between the sections of said handle, a hand grip having a sleeve to receive the outer end of said handle, said plate extending throughout the length of said socket and said sleeve and secured thereto and forming a continuous metallic connection between said hand grip and blade.

2. A shovel comprising a blade having a hollow shank forming a socket, a handle having one end fitting into said socket and composed of longitudinally divided sections, a hand grip having a shank and socket to receive the other end of said handle, a reinforcing metallic plate fitting between the sections of said handle, the edges of said plate at the ends thereof contacting with the inner walls of the sockets of said blade and hand grip and said plate extending to the end of said blade socket and conforming to the curvature thereof and providing a continuous metallic connection between said blade and hand grip, and means for securing said socket, said handle sections and said blade together.

3. A ground-working implement comprising a blade having a hollow shank forming a socket and handle composed of longitudinally divided sections fitting at one end into said socket, a hand grip having a shank and socket therein to receive the outer end of said handle, and a reinforcing plate interposed between the sections of said handle and of sufficient width at the ends to bear on the inner walls of said blade and hand-grip sockets, the middle portion of said plate being of less width than the diameter of said handle sections to provide comparatively wide bearing surfaces for said sections, one upon the other, on each side of and concealing said plate.

In witness whereof, I have hereunto set my hand this 16th day of June 1922.

MARTIN HOKANSON.